(12) United States Patent
Arimilli et al.

(10) Patent No.: US 6,487,679 B1
(45) Date of Patent: Nov. 26, 2002

(54) ERROR RECOVERY MECHANISM FOR A HIGH-PERFORMANCE INTERCONNECT

(75) Inventors: Ravi Kumar Arimilli, Austin, TX (US); Vicente Enrique Chung, Austin, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,041

(22) Filed: Nov. 9, 1999

(51) Int. Cl.[7] .............................................. G06F 11/08
(52) U.S. Cl. ........................................ 714/17; 714/43
(58) Field of Search ............................. 714/43, 23, 55, 714/56, 17; 710/109, 110

(56) References Cited

U.S. PATENT DOCUMENTS 5,774,679 A * 6/1998 Kondo et al. ............... 710/105
6,049,894 A * 4/2000 Gates ........................... 714/30

* cited by examiner

Primary Examiner—Scott Baderman
(74) Attorney, Agent, or Firm—Volel Emile

(57) ABSTRACT

An error recovery mechanism for an interconnect is disclosed. A data processing system includes a bus connected between a bus master and a bus slave. In response to a parity error occurring on the bus, the bus slave issues a bus parity error response to the bus master via the bus. After waiting for a predetermined number of bus cycles to allow the bus to idle, the bus master then issues a RESTART bus command packet to the bus slave via the bus to clear the parity error. If the RESTART bus command packet is received correctly, the slave bus will remove the parity error response such that normal bus communication may resume.

20 Claims, 3 Drawing Sheets

ERROR RECOVERY MECHANISM FOR A HIGH-PERFORMANCE INTERCONNECT

BACKGROUND OF THE INVENTION

1. Technical Field

The present invention relates to a data processing system in general, and in particular to a parity error recovery mechanism within a data processing system. Still more particularly, the present invention relates to a parity error recovery mechanism for an interconnect within a data processing system.

2. Description of the Prior Art

Within a data processing system, various devices, such as a processor, a system memory, etc., are typically interconnected with each other via a group of wires known as a bus. In fact, the technique of using a bus to transmit data has been in common use since the early days of electronic computers. Two types of buses are typically utilized in a data processing system, namely, a data bus and an address bus. As their names imply, the data bus is utilized to transmit data, and the address bus is utilized to transmit addresses. There are many advantages in using a single interconnect such as a bus for interconnecting devices within a data processing system. For example, new devices can easily be added or even be ported between data processing systems that use a common bus.

Occasionally, a parity error may occur on a bus within a data processing system. According to the prior art, bus parity error recovery is typically handled by a group of pins known as error correction code (ECC) pins that are built into certain devices. However, additional area is required on a device to accommodate such ECC pins, not to mention that the latency of data transfer on the bus will be increased due to the additional time required to generate ECC at a bus master and to check the ECC (and possibly correct corrupted data/address bits) at a bus slave. Thus, it would be desirable to provide an improved parity error recovery mechanism for a bus within a data processing system such that ECC pins are not required.

SUMMARY OF THE INVENTION

In accordance with a preferred embodiment of the present invention, a data processing system includes a bus connected between a bus master and a bus slave. In response to a parity error occurring on the bus, the bus slave issues a bus parity error response to the bus master via the bus. After waiting for a predetermined number of bus cycles to allow the bus to idle, the bus master then issues a RESTART bus command packet to the bus slave via the bus to clear the parity error. If the RESTART bus command packet is received correctly, the slave bus will remove the bus parity error response such that normal bus communication may resume.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2b is a high-level logic flow diagram of a method for a bus slave to respond to a parity error, in accordance with a preferred embodiment of the present invention.

DETAILED DESCRIPTION OF A PREFERRED EMBODIMENT

Figure 1:
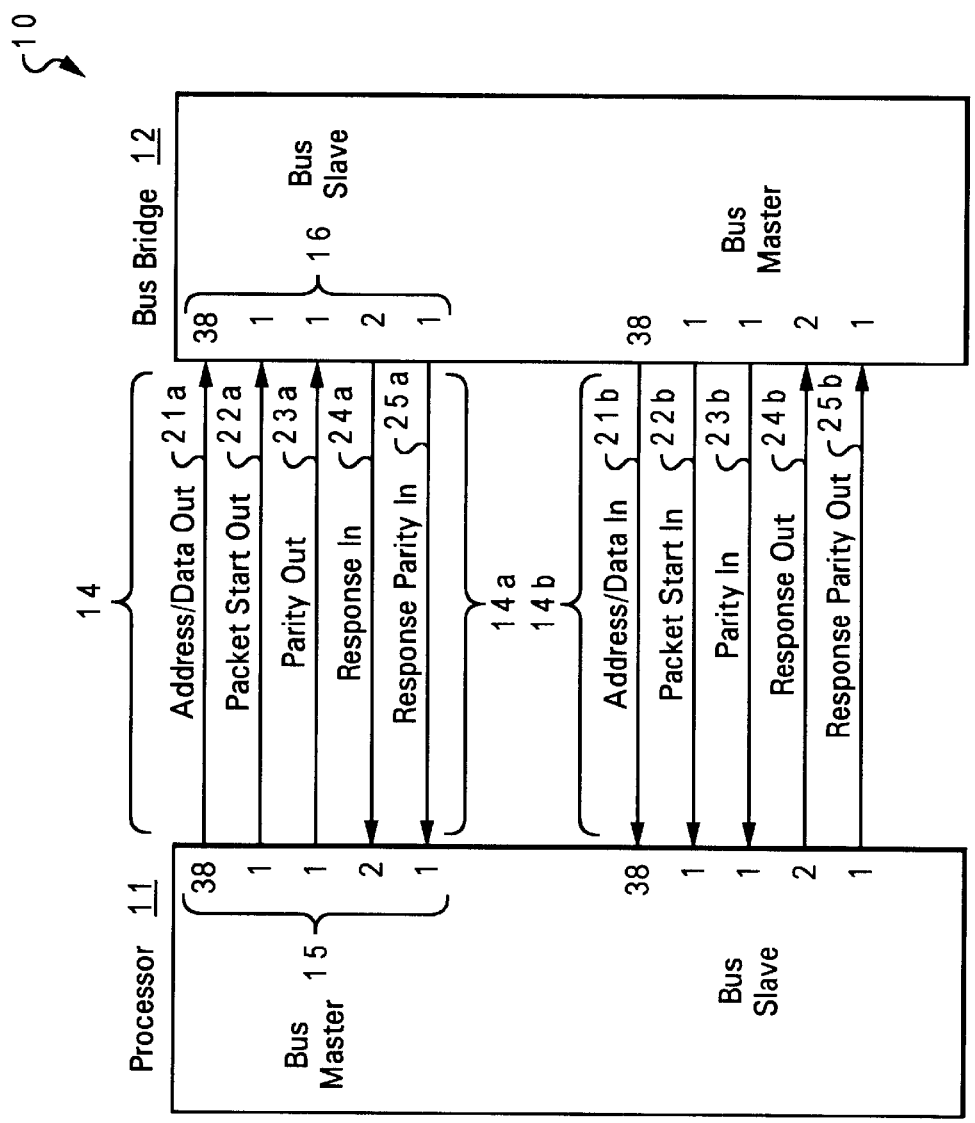
FIG. 1 is a block diagram of a data processing system in which a preferred embodiment of the present invention is incorporated.

Referring now to the drawings and in particular to FIG. 1, there is depicted a block diagram of a data processing system in which a preferred embodiment of the present invention is incorporated. As shown, a data processing system 10 is represented by two devices, namely, a processor 11 and a bus bridge 12. For the purpose of illustrating the present invention, only processor 11 and bus bridge 12 are shown in FIG. 1; however, it is understood by those skilled in the art that data processing 10 may include many other devices, such as memories, controllers, etc., to perform different data processing functions.

Processor 11 and bus bridge 12 are interconnected by a point-to-point uni-directional bus 14. Since bus 14 is uni-directional, bus 14 is divided into a sub-bus 14a and a sub-bus 14b for two-way communication between processor 11 and bus bridge 12. Further, each of sub-buses 14a and 14b has a bus master and a bus slave, for sending and receiving command or data. For example, sub-bus 14a includes a bus master 15 and a bus slave 16. A bus master is defined as a device that issues a command or data, and a bus slave is defined as a device that receives the command or data issued by the bus master.

All command or data transfers on sub-buses 14a, 14b are preferably in the form of packets that are either two beats in length (for command transfers) or four beats in length (for data transfers). Each command or data packet that is issued on sub-buses 14a, 14b will receive a response packet some fixed time later to indicate either the packet has been received and accepted, or some type of error or device busy condition has occurred. Packets that are not accepted will be reissued on sub-buses 14a, 14b for completion. Both sub-buses 14a, 14b are highly pipelined in that multiple commands or data packets may be active on subbuses 14a, 14b at one time. Command and data packets are in an active state until the appropriate responses for the command and data packets-are received.

Each of sub-buses 14a, 14b can be characterized into two bus groups, namely, an outbound command/data bus group and an inbound response bus group. For example, the outbound command/data bus group of sub-bus 14a includes an address/data bus 21a, a packet start line 22a, and a parity signal line 23a; and the inbound response bus group of sub-bus 14a includes a response bus 24a and a response parity signal line 25a. Similarly, the outbound command/data bus group of sub-bus 14b includes an address/data bus 21b, a packet start line 22b, and a parity signal line 23b; and the inbound response bus group of sub-bus 14b includes a response bus 24b and a response parity signal line 25b. The numbers adjacent to buses/lines 21a–25a and 21a–25b indicate the width of the corresponding buses/lines (or the number of pins required on the device).

Because sub-bus 14a is identical to sub-bus 14b, only sub-bus 14a will be used to further illustrate the present invention. When a bus error occurs during the transmission of a command or data packet from bus master 15 to bus slave 16 of sub-bus 14a, it is typically the result of either a hard bus failure (such as broken wire or broken contact) or a soft failure (such as noise on the bus). A system shutdown is commonly required to "clear" a hard bus failure. But in order to avoid system shutdown in a soft failure situation, a parity error recovery mechanism, in accordance with a preferred embodiment of the present invention, is included within sub-bus 14a to reissue the command or data packets affected by the soft failure such that normal bus communication can be resumed on sub-bus 14a without resorting to a system shutdown. The parity error recovery mechanism of the present invention is described here below, with reference to the high-level flow diagrams depicted in FIGS. 2a and 2b.

In response to a bus error detected, bus slave 16 sends a parity error response to bus master 15. The detection of a bus error can be performed by any means that is well-known in the art. Note that once the bus error has occurred on sub-bus 14a, bus slave 16 will preferably respond all command and data packets that are in flight on sub-bus 14a with a respective parity error response automatically.

Figure 2A:
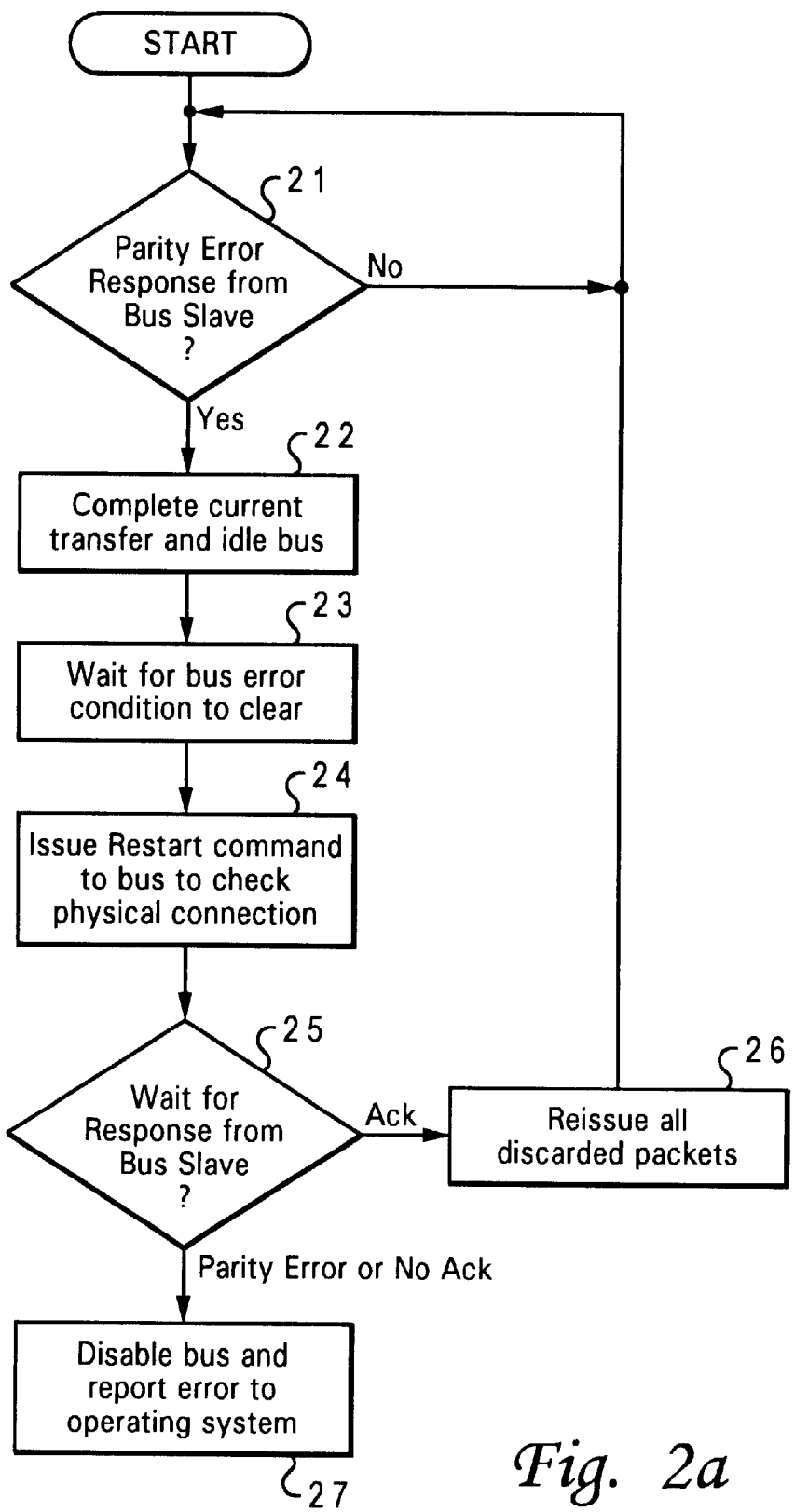
FIG. 2a is a high-level logic flow diagram of a method for a bus master to respond to a parity error, in accordance with a preferred embodiment of the present invention.
Figure 26:
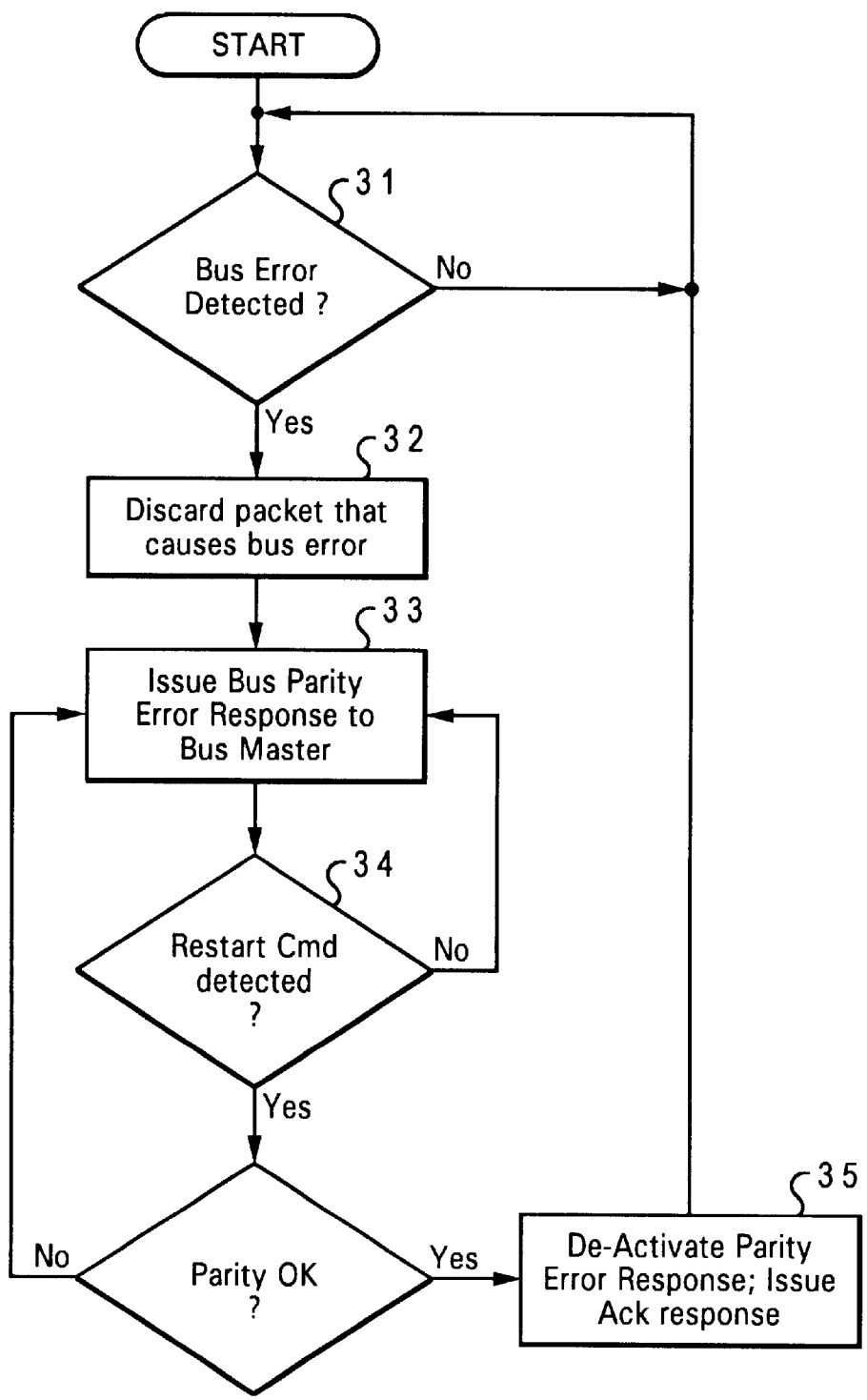

The responses of bus master 15 to a bus error for a command or data packet that bus master 15 has issued to bus slave 16 via sub-bus 14a are illustrated in FIG. 2a. As mentioned previously, after the occurrence of a bus error, bus slave 16 sends a parity error response to bus master 15. After the receipt of the parity error response by bus master 15, as shown in block 21, if bus master 15 is currently transferring a command or data packet on sub-bus 14a, bus master 15 needs to complete the command or data packet transfer and then idles sub-bus 14a, as shown in block 22. Next, bus master 15 waits for a predetermined number of bus cycles to allow the error condition on sub-bus 14a to clear, if possible, as depicted in block 23. The predetermined number of bus cycles is a programmable value and is preferably set to 500 bus cycles. If the bus error condition is caused by noise transients, 500 bus cycles should be sufficient for the noise transients to clear.

Bus master 15 then issues a RESTART command packet to bus slave 16 via sub-bus 14a to clear the parity error response previously initiated by bus slave 16, as illustrated in block 24. This RESTART command packet is transmitted to check the integrity of the physical connection between bus master 15 and bus slave 16. Bus master 15 then waits for bus slave 16 to send a response for the RESTART command packet, as shown in block 25. If the response from bus slave 16 is an Ack response, then bus master 15 reissues all command/data packets that were previously discarded due to the bus error to bus slave 16 via sub-bus 14a, as depicted in block 26, and normal bus communications are resumed.

Otherwise, if the response from bus slave 16 is an No Ack or parity error response, then sub-bus 14a is determined to have a hard failure. Accordingly, sub-bus 14a is disabled and the hard error is reported to a system error handling routine of an operating system, as illustrated in block 27. At this point, a system shutdown may be required to correct the hard error.

FIG. 2b illustrates responses of bus slave 16 when bus slave 16 detects a bus error for a command or data packet that bus slave 16 receives from sub-bus 14a. If a bus error is detected, as shown in block 31, bus slave 16 then discards the command or data packet that was associated with the bus error, as shown in block 32. Next, bus slave 16 issues a parity error response to bus master 15, as depicted in block 33 (bus master 15 receives this parity error response in block 21 of FIG. 2a). Bus slave 16 then sustains the parity error response on the response bus (such as response parity signal line 25a from FIG. 1) for subsequent cycles until the receipt of a RESTART command packet from bus master 15, as illustrated in block 34. All command or data packets that are received after the bus parity error are discarded (even if the parity is good) until the RESTART comm and packet is received from bus master 15.

If the RESTART command packet from bus master 15 is received correctly, then bus slave 16 deactivates the sustained parity error response, and issues an Ack response to bus master 15 for the correctly received RESTART command packet (bus master 15 receives this Ack response in block 25 of FIG. 2a), as shown in block 35. If there is a parity error on the command or data packet, then bus slave 16 continues to maintain the parity error response on the response bus.

As has been described, the present invention provides an error recovery mechanism for a bus within a data processing system. Although parity errors are utilized to illustrate a preferred embodiment of the present invention, it is understood the present invention is also applicable to handle other types of errors.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method of recovering from an error occurring on a bus within a data processing system, said method comprising the steps of:
   detecting an error on a bus;
   in response to an error occurring on a bus, issuing a bus parity error response by a bus slave via said bus to a bus master;
   waiting for a predetermined number of bus cycles to allow said bus to idle; and
   issuing a RESTART bus command packet by said bus master via said bus to said bus slave to clear said parity error response.

2. The method according to claim 1, wherein said method further includes a step of removing said bus parity error response by said bus slave if said RESTART bus command packet is correctly received by said bus slave, such that normal bus operation may resume.

3. The method according to claim 2, wherein said removing step further includes a step of reissuing any packet that was previously discarded due to said parity error by said bus master to said bus slave.

4. The method according to claim 1, wherein said method further includes a step of sending an acknowledgement signal from said bus slave to said bus master if said RESTART bus command packet is correctly received by said bus slave.

5. The method according to claim 1, wherein said method further includes a step of disabling said bus if said RESTART bus command packet is not correctly received by said bus slave.

6. The method according to claim 5, wherein said method further includes a step of sending a non-acknowledge signal from said bus slave to said bus master if said RESTART bus command packet is not correctly received by said bus slave.

7. The method according to claim 5, wherein said method further includes a step of reporting said parity error to an operating system.

8. A data processing system capable of recovering from a parity error occurring on a bus, comprising:

means for detecting an error on a bus;

means for issuing a bus parity error response by a bus slave via said bus to a bus master, in response to a parity error occurring on a bus;

means for waiting for a predetermined number of bus cycles to allow said bus to idle;

means for issuing a RESTART bus command packet by said bus master via said bus to said bus slave to clear said parity error response.

9. The data processing system according to claim 8, wherein said data processing system further includes a means for removing said bus parity error response by said bus slave if said RESTART bus command packet is correctly received by said bus slave, such that normal bus operation may resume.

10. The data processing system according to claim 9, wherein said removing means further includes a means for reissuing any packet that was previously discarded due to said parity error by said bus master to said bus slave.

11. The data processing system according to claim 8, wherein said data processing system further includes a means for sending an acknowledgement signal from said bus slave to said bus master if said RESTART bus command packet is correctly received by said bus slave.

12. The data processing system according to claim 8, wherein said data processing system further includes a means for disabling said bus if said RESTART bus command packet is not correctly received by said bus slave.

13. The data processing system according to claim 12, wherein said data processing system further includes a means for sending a non-acknowledge signal from said bus slave to said bus master if said RESTART bus command packet is not correctly received by said bus slave.

14. The data processing system according to claim 12, wherein said data processing system further includes a means for reporting said parity error to an operating system.

15. A computer program product residing on a computer usable medium for recovering from a parity error occurring on a bus within a data processing system, said computer program product comprising:

program code means for detecting an error on a bus;

program code means for issuing a bus parity error response by a bus slave via said bus to a bus master, in response to a parity error occurring on a bus;

program code means for waiting for a predetermined number of bus cycles to allow said bus to idle;

program code means for issuing a RESTART bus command packet by said bus master via said bus to said bus slave to clear said parity error response; and program code means for removing said bus parity error response by said bus slave if said RESTART bus command packet is correctly received by said bus slave, such that normal bus operation may resume.

16. The computer program product according to claim 15, wherein said program code means for removing further includes a program code means for reissuing any packet that was previously discarded due to said parity error by said bus master to said bus slave.

17. The computer program product according to claim 15, wherein said computer program product further includes a program code means for sending an acknowledgement signal from said bus slave to said bus master if said RESTART bus command packet is correctly received by said bus slave.

18. The computer program product according to claim 15, wherein said computer program product further includes a program code means for disabling said bus if said RESTART bus command packet is not correctly received by said bus slave.

19. The computer program product according to claim 18, wherein said computer program product further includes a program code means for sending a non-acknowledge signal from said bus slave to said bus master if said RESTART bus command packet is not correctly received by said bus slave.

20. The computer program product according to claim 18, wherein said computer program product further includes a program code means for reporting said parity error to an operating system.

\* \* \* \* \*